2,961,297
PROCESS FOR PRODUCING ALUMINA OF LOW SODA CONTENT

Michael John Fenerty, Arvida, Quebec, Canada, assignor to Aluminium Laboratories Limited, Montreal, Quebec, Canada, a corporation of Canada No Drawing. Filed Oct. 24, 1956, Ser. No. 617,947

13 Claims. (Cl. 23—142)

This invention relates to the purification of alumina and particularly to the production of alumina having a low content of soda, the latter term being employed to mean sodium in combined form. Sodium compounds in alumina are conventionally referred to as soda (sodium oxide, $Na_2O$) whether or not the sodium is present in such form.

For various purposes alumina, e.g. calcined alumina, is required to have a very low content of soda, for example when it is employed as a major constituent in high grade ceramic bodies, such as spark plug insulators. A common source of alumina is alumina trihydrate as produced by the Bayer or similar procedures wherein bauxite or other aluminous material is treated to yield a solution of sodium aluminate, from which the alumina trihydrate is precipitated and separated. The trihydrate is usually calcined to provide anhydrous alumina, but such product often has a soda content, e.g. 0.4 to 0.6% and upwards (measured as $Na_2O$ on the basis of $Al_2O_3$), which is much too high for use in ceramics for spark plugs and a number of other purposes.

Since this soda in the alumina cannot be removed by ordinary calcining or washing, various special treatments have been proposed for reducing it in amount. For example, one method has been designed to volatilize soda during calcination, by including with the alumina trihydrate a substance such as boric oxide (in the form of boric acid) adapted to react with the contaminant in the alumina to yield sodium compounds that are volatile at the temperatures of calcination. Alternatively, leaching treatments have been proposed, such as a combination of pressure leaching and subsequent calcination, or repeated alternations of calcining or leaching steps, or vigorous leaching of regular calcined alumina with concentrated solutions of acid such as hydrofluoric or fluoboric.

In general, these methods have various disadvantages such as high cost, contamination of the product with reagents used for soda removal, excessively high temperature requirements, or undue complexity in the sequence of operations needed. A primary aim of the present invention is therefore to provide a simple, convenient and relatively inexpensive process whereby alumina can be produced with a satisfactorily low content of soda, for example as low as 0.1% or 0.05% or even less.

The present invention involves the discovery that if alumina of any degree of hydration is calcined with a so-called mineralizer such as aluminum fluoride, the resulting material can be leached with plain water or with dilute acid or alkali to a much lower residual soda level than is possible with the material resulting from calcination without the addition of a mineralizer. This specific mineralizing operation is known but it has not heretofore been recognized that simple leaching of the sort just described would be of any use for beneficiating the resulting product in respect of its contamination with soda.

While heretofore it has been supposed that removal of soda by a leaching operation upon alumina (however calcined or produced) required the use of concentrated acid solutions or other costly or complex operations, the present process rests on the unexpected finding that alumina resulting from calcination of alumina trihydrate with aluminum fluoride can be effectively converted to a low soda product by simple leaching with plain water or very dilute reagent solutions. In consequence the purification of the alumina, i.e. to separate soda, becomes a convenient and relatively inexpensive process.

The precise basis of the process, i.e. with respect to a theory or reason for the unusual effectiveness of the plain water or dilute reagent leaching of alumina which results from calcination of alumina trihydrate in the presence of aluminum fluoride, is not fully understood, but some light was shown by an experiment wherein a sample of such alumina was subjected to extended washings with distilled water, in the manner of the improved process. The water washings were evaporated to dryness and yielded plate-like crystals which were then subjected to X-ray examination. The X-ray diffraction patterns indicated that these crystals consisted almost entirely of sodium fluoride and cryolite (sodium aluminum fluoride, $Na_3AlF_6$); it would appear, therefore, that easily soluble sodium compounds resulted from the mineralizing treatment, and their presence may be taken to explain the effectiveness of the described leaching operations. For instance, sodium hydroxide is not ordinarily effective, even in concentrated form, in removing the sodium compounds from alumina but the conversion products of the mineralizing treatment are characterized by greater solubility in alkaline conditions.

It is also thought that the crystal srtucture of the material resulting from calcination with a mineralizer such as aluminum fluoride has some bearing on the effectiveness of the simple leaching operation. In the absence of a mineralizer, calcination of alumina trihydrate at a sufficiently high temperature, viz. 1300° C. and above, produces alpha alumina but the crystals which make up the product are not very distinct in their shape, being present mainly as aggregates. The addition of a mineralizer such as aluminum fluoride not only lowers the effective temperature of conversion to the alpha form but also results in the production of a preponderance of single crystals in the distinct form of hexagonal plates and the product is subsequently referred to herein as recrystallized alumina. It appears that the preponderance of single crystals in recrystallized alumina as compared with the aggregates resulting from calcination without a mineralizer facilitates the effectiveness of simple leaching of the sort described.

It has also been discovered that the water adsorbed or absorbed on the surface of the mineralized alumina during the leaching process, can be easily removed at relatively low temperatures. Thus where recrystallized alumina has been produced by procedure as described above, and thereafter subjected to the simple leaching, with a final water wash where the leaching solution is dilute acid or alkali, a simple drying operation, as at room temperature or with no more than a little heat is sufficient to eliminate the water in the product, to the extent required by various ultimate uses such as the manufacture of ceramic insulation.

While the improved process can be effectively performed by leaching with plain water, special advantage has been found in the use of dilute acids or alkalis. For instance, as indicated in the examples given below, when recrystallized alumina is leached with plain water, a reduction of the soda content to a value such as 0.13% was achieved, whereas the use of a 1% alkali leach on the same alumina (instead of plain water) brought the soda content to about 0.04%, and the alternative use of 1% acid solution, again on the same alumina, resulted in a product having only 0.02% soda. As indicated above, the percentage of soda is given in all cases as percentage by weight of $Na_2O$, based on $Al_2O_3$. Hence the procedure involving dilute acid or dilute alkali leaching represents a further and specific feature of invention, present understanding being that the dilute acid treatment is the most effective and thus appears to be preferable.

It may be explained that although the improved process is very advantageous for treating alumina trihydrate, in its broader aspects it is not confined to the use of the trihydrate as the starting material. Thus the process may be applied to the reduction of the soda content in alumina of any degree of hydration (from zero upward), e.g. in alumina that has already been partially or fully calcined. Such materials are subjected to the mineralizing and leaching treatments in the same way, the mineralizing treatment being effective, as at present understood, to produce substantial recrystallization of the alumina. Hence in general where the starting material is described herein simply as alumina, it will be understood that such term includes the trihydrate and means alumina of any degree of hydration as just explained.

The practical advantages of the process are considerable, especially where dilute acid or dilute alkali are employed. The leaching step is fast and effective, while at the same time the recrystallized alumina does not appreciably absorb water or acids or alkalis. The final washing is a simple step and there is no need for a second calcining to remove water from the product. As explained above, simple drying at low temperature is sufficient. As will be appreciated, the operation is readily adapted to present plants for producing alumina, where suitable calcining equipment is conventionally employed.

The calcining step of the process can thus be performed in any appropriate apparatus, preferably a rotary kiln, as of the direct fired type where the alumina trihydrate is introduced at the higher or cold end and travels countercurrently to the hot gases flowing through from the heated or alumina discharge end, the heat being supplied by flame projected into the kiln. The aluminum fluoride, as mineralizer, can be simply mixed, in finely divided form, into the alumina trihydrate as the latter is fed to or into the kiln. Calcination is conveniently effected at about 1100° to 1200° C., i.e. such being approximately the temperature reached in the mass of alumina at the bed of the kiln. The mineralizer ($AlF_3$) may be used in amounts from 0.1% to 10% of the weight of alumina in the feed.

The grade of the ultimate product, as to residual soda, improves somewhat with increase in the amount of mineralizer, the preferred compound for that purpose being aluminum fluoride in amounts from 0.5 to 3%, of the $Al_2O_3$. For instance, alumina produced by calcining at 1100° C. with 0.4% aluminum fluoride and then leached with plain water exhibited a residual soda content of 0.17%. The product of identical operation where the aluminum fluoride was used in amount of 2.5% showed a residual soda of 0.07%. It is understood that other substances, such as hydrofluoric acid and its ammonium salt, may be employed as mineralizers, with like effect in converting the alumina to a recrystallized, alpha form and combining with the soda to form easily soluble sodium salts thereby enabling useful removal of soda by subsequent leaching with water, dilute acid or dilute alkali; however, the use of aluminum fluoride as mineralizer affords unusually successful results, particularly in the purity of the ultimate product, and therefore represents a feature of particular improvement, in a specific aspect of the invention.

The temperature of calcination may vary somewhat, a generally useful range being from about 1000° to 1400° C. Higher temperatures than the latter value seem to be unnecessary; indeed an advantage of the process is that it avoids the inefficiency which would be involved in the large heat requirement of operation at substantially higher temperatures. Other apparatus, such as fluidizers, can be employed for the calcining and mineralizing step. It may be explained that in general the mineralizing step need not be such as to effectuate substantial removal of soda by volatilization, although even where some soda removal may thus occur, the present process, involving the described leaching, is nevertheless useful in the achievement of an ultimate product having extremely low soda. If desired, advantage may be taken of a recent discovery of improvement in the volatilization of sodium compounds by procedure wherein a mineralizer such as aluminum fluoride is fed to the hot end of the calcining kiln, as in suspension in the air supplied to the burner. Whereas such special calcining operation itself may reduce soda to moderately low values, the addition of the present process thereto affords a substantial, further reduction of soda to yield an exceptionally pure alumina. Alternatively, the present process permits achievement of an ultimate, low-soda product with less aluminum fluoride than would ordinarily be preferred for optimum results in the described special process for eliminating soda by volatilization. Indeed a particular advantage of the instant method is that in the calcining step, however performed, the amount of mineralizer may be substantially less than is ordinarily deemed necessary where the mineralizer is to accomplish soda removal by volatilization.

The leaching step can be carried out in any of a variety of apparatus suitable for simple leaching, such as filters, mixers or other conventional equipment. It is preferred that the water or dilute solution employed in this operation be hot, e.g. boiling, although good results can also be obtained with cold water or solutions, used over a somewhat longer period of time. In the case of hot water or hot solutions, for example, the leaching is usually effective if the liquid is allowed to permeate the recrystallized alumina, or be mixed with it, over a relatively short period such as 5 minutes. As indicated the ultimate product has a low content of soda, i.e. less than 0.2% and generally well below 0.1%.

The use of plain water, or only the very dilute acid or alkali solution for leaching is, as stated, an important feature of the invention, affording very substantial economy. Dilute hydrochloric acid solutions, in concentrations of 0.01% and above, are highly effective, but it is contemplated that other acids may be used, especially other mineral acids such as sulfuric and hydrofluoric. Dilute solutions of sodium hydroxide and ammonium hydroxide have likewise been effectively employed, for example, in concentrations of 0.01% and more. Other conventional reagent alkali is understood to be suitable, in corresponding amount, such as potassium hydroxide. Water containing acid or alkali in amount below the above minimum of 0.01% can be considered as plain water. In general, from the minimum upward, dilute acid or alkali solutions suitable for the leaching step are to be understood as embracing any concentration less than 5%, experience showing that essentially no improvement, with the present process, is achieved in using stronger solutions. It is found, moreover, that in most cases fully effective results are obtained by leaching with acid or alkali solutions of not more than 2% concentration, such operation affording unusual economy of reagent. Hence a further and specific feature of invention may be deemed to reside in the process where the leaching solution has an acid or alkali content of not more than 2%.

Where acid or alkali solution is utilized, the leaching operation is very preferably concluded with a short wash in plain water. The efficiency of the leaching, however, is indicated by the fact that the soda content of the alumina product is practically the same before and after this final wash.

The ultimate drying step can be performed by any conventional method, such as atmospheric drying at room or moderately higher temperature or drying in vacuum with or without applied heat. Ordinarily the drying temperature need not be higher than, say, about 200° C.; temperatures of the order employed for calcination are not necessary, it being of special advantage that in the present process a second calcining step would be entirely superfluous except where further modification of crystal form is required thereby resulting in a higher proportion of single crystals in the distinct form of hexagonal plates. For example, normal, atmospheric drying at 105° C. has been found to eliminate the water satisfactorily, for uses of a product as ordinarily contemplated, the dried alumina then exhibiting a loss on ignition of less than 0.5%.

Certain examples of the process, involving leaching with plain water, have been described above as involving calcination of alumina trihydrate (having an initial soda content of about 0.6%) with different amounts of aluminum fluoride, and yielding ultimate products, after the leaching, with residual soda of 0.17% to 0.07%. The following are further examples, wherein the alumina trihydrate again containing about 0.6% soda, was calcined with 3% of aluminum fluoride at 1200° C. In each of the following operations, 20 grams of the mineralized alumina were then boiled with 200 milliliters of the leaching liquid for ten minutes. The alumina was separated by filtration, washed with 200 milliliters of water and finally dried, at about 100° C. as indicated above. As elsewhere herein, all values are given as proportions or concentrations by weight.

| | Leaching Liquid or Reagent | Soda Content of Product, percent Na$_2$O |
| --- | --- | --- |
| Example I | Water | 0.13 |
| Example II | 0.1% sodium hydroxide solution | 0.05 |
| Example III | 1.0% sodium hydroxide solution | 0.04 |
| Example IV | 1.0% hydrochloric acid solution | 0.02 |
| Example V | 0.1% hydrochloric acid solution | 0.04 |
| Example VI | 1% ammonia solution | 0.04 |

As will be seen, the analyses of the products for soda showed a remarkable purification, especially with the dilute acid and alkaline leaching solutions. By way of comparison the same operation was performed with a 10% sodium hydroxide solution used for leaching. The product did not exhibit a soda content any less than that resulting from a leach with alkali solutions below 5% (or specifically, with alkali solutions of only 1% concentration), thus demonstrating the economy of the present process.

It is to be understood that the present invention is not limited to the specific procedures hereinabove described but may be carried out in other ways without departure from its spirit.

I claim:

1. Procedure for purification of alumina to remove soda, comprising supplying a quantity of alumina in divided form to a calcining region which has a discharge locality for removal of calcined product, calcining said quantity of alumina in said region with a fluoride mineralizer which is a substance that has the characteristic of producing substantially recrystallized alumina during said calcination, said substance also having the chemical characteristic of reacting with the soda content of said alumina to form a water soluble sodium salt during said calcination, said calcining step comprising heating said quantity of alumina in the presence of said mineralizer to a temperature of at least about 1000° C., to produce said alumina in said substantially recrystallized form as alpha alumina containing an unvolatilized residue of a water-soluble fluoride salt of sodium, discharging at the aforesaid locality substantially the entirety of said quantity of alumina in its said calcined recrystallized form, said mineralizer reacting with said soda of the alumina during calcination to produce a quantity of said last-mentioned salt which remains unvolatilized in said discharged alumina, and removing such salt by subjecting said recrystallized alumina, which was discharged as aforesaid in calcined form, to leaching with aqueous liquid selected from the class consisting of dilute water solutions of mineral acids, dilute water solutions of inorganic alkalis, and plain water, said solutions of acids and said solutions of alkalis each having a concentration of less than 5%.

2. Procedure as defined in claim 1, wherein the selected aqueous liquid for leaching is an acid solution having a concentration of not more than 2%.

3. Procedure as defined in claim 1, wherein the selected aqueous liquid for leaching is an alkali solution having a concentration of not more than 2%.

4. Procedure as defined in claim 1, wherein the selected aqueous liquid for leaching is plain water.

5. Procedure for purification of alumina to remove soda, comprising supplying a quantity of alumina in divided form to a calcining region which has a discharge locality for removal of calcined product, calcining said quantity of alumina in said region with a fluoride mineralizer in amount of 0.1 to 10% of the Al$_2$O$_3$, at a temperature between about 1000° and about 1400° C. to produce recrystallized alumina as alpha alumina containing an unvolatilized residue of a water-soluble fluoride salt of sodium, said mineralizer being a substance that has the characteristic of producing substantially recrystallized alumina during said calcination and the chemical characteristic of reacting with the soda content of said alumina to form said water soluble sodium salt during said calcination, discharging at the aforesaid locality substantially the entirety of said quantity of alumina in its said calcined recrystallized form, said mineralizer reacting with said soda of the alumina during calcination to produce a quantity of said salt which remains unvolatilized in said discharged alumina, and removing said salt by subjecting said recrystallized alumina, which was discharged as aforesaid in calcined form, to leaching with aqueous liquid selected from the class consisting of dilute water solutions of mineral acids, dilute water solutions of inorganic alkalis, and plain water, said solutions of acids and said solutions of alkalis each having a concentration of less than 5%.

6. Procedure as defined in claim 5, wherein the leaching is effected with the aqueous liquid at approximately boiling temperature.

7. Procedure as defined in claim 5, wherein the leaching operation is effected with a dilute acid solution and includes finally washing the alumina with plain water, and wherein after the leaching operation the alumina is dried without further calcining.

8. Procedure as defined in claim 5, wherein the leaching operation is effected with a dilute alkali solution and includes finally washing the alumina with plain water, and wherein after the leaching operation the alumina is dried without further calcining.

9. Procedure for purification of alumina to remove soda, comprising supplying a quantity of alumina trihydrate in divided form to a calcining region which has a discharge locality for removal of calcined product, calcining said quantity of alumina trihydrate at a temperature of at least about 1000° C. in said region with aluminum fluoride to produce recrystallized alumina as alpha alumina containing an unvolatilized residue of a water-soluble fluoride salt of sodium, discharging at the aforesaid locality substantially the entirety of said quantity of alumina in its said calcined recrystallized form, said aluminum fluoride reacting with the soda content of said alumina trihydrate during calcination to convert a quantity of said soda to said soluble sodium salt which remains unvolatilized in said discharged alumina, and removing such salt by subjecting said recrystallized alumina, which was discharged as aforesaid in calcined form, to leaching with aqueous liquid selected from the class consisting of dilute water solutions of mineral acids, dilute water solutions of inorganic alkalis, and plain water, said solutions of acids and said solutions of alkalis each having a concentration of less than 5%.

10. Procedure as defined in claim 9, wherein the aluminum fluoride is employed with the alumina trihydrate in amount of 0.1 to 10% of the $Al_2O_3$, and the calcination is effected at a temperature between about 1000° and about 1400° C.

11. Procedure as defined in claim 10, wherein the aluminum fluoride is employed in amount of 0.3 to 3% of the $Al_2O_3$.

12. Procedure as defined in claim 9, wherein the selected aqueous liquid for leaching is a solution of sodium hydroxide having a concentration of 0.01 to 2%, and wherein the leaching operation includes finally washing the alumina with plain water.

13. Procedure as defined in claim 9, wherein the selected aqueous liquid for leaching is a solution of hydrochloric acid having a concentration of 0.01 to 2%, and wherein the leaching operation includes finally washing the alumina with plain water.

References Cited in the file of this patent

UNITED STATES PATENTS

| | | |
|---|---|---|
| 1,036,454 | Childs | Aug. 20, 1912 |
| 2,069,060 | Fessler | Jan. 26, 1937 |
| 2,469,088 | Thompson | May 3, 1949 |
| 2,769,688 | Milliken et al. | Nov. 6, 1956 |
| 2,833,622 | Roberts et al. | May 6, 1958 |
| 2,887,361 | Fenerty | May 19, 1959 |